April 1, 1952 — A. SCHMALZ — 2,591,203
PIN FORMING AND BUTTON-PINNING MECHANISM
Filed May 31, 1950 — 9 Sheets-Sheet 3

INVENTOR.
Albano Schmalz
BY David Manly Heller
Attorney

April 1, 1952  A. SCHMALZ  2,591,203
PIN FORMING AND BUTTON-PINNING MECHANISM
Filed May 31, 1950  9 Sheets-Sheet 5

INVENTOR.
Albano Schmalz
BY
Attorney

April 1, 1952     A. SCHMALZ     2,591,203
PIN FORMING AND BUTTON-PINNING MECHANISM
Filed May 31, 1950     9 Sheets-Sheet 6

INVENTOR.
Albano Schmalz
BY
Attorney

April 1, 1952 — A. SCHMALZ — 2,591,203
PIN FORMING AND BUTTON-PINNING MECHANISM
Filed May 31, 1950 — 9 Sheets-Sheet 9

INVENTOR.
Albano Schmalz
BY
Attorney

Patented Apr. 1, 1952

2,591,203

UNITED STATES PATENT OFFICE 2,591,203

PIN FORMING AND BUTTON-PINNING MECHANISM

Albano Schmalz, Chicago, Ill.

Application May 31, 1950, Serial No. 165,295

15 Claims. (Cl. 79—1)

My invention appertains to pin forming and button pinning machines.

An important object of my invention is to provide a new and improved form of machine for forming pins and attaching them automatically to hollow buttons such as the type that are used for advertising purposes.

A further object of my invention is to provide a machine of the aforementioned character in which the pin material is fed from a hopper subsequently to its having been cut to proper length and having been pointed at one end. The hopper mechanism delivering to a chute the said pin forming blanks in superimposed relationship; slide means for feeding the lowermost pin blank to an angular bending and substantially semicircular forming station; hopper means for feeding the stamped and formed buttons; slide means for delivering a single button to the pin-bending forming and assembling means for assembling the pin formed heretofore to the button fed thereunder, and ejection of the complete assembly of the said hollow button and the formed pin in assembly therewith.

Another object of my invention is to provide in a machine of the aforementioned character pin forming and bending mechanism which operates on the principle of first bending the wire by means of a moving punch downwardly on a die, subsequently by proper timing of the cycle, the said punch mechanism rotates to form a substantially semi-circular inserting portion on the said pin mechanism, and subsequently, in the cycle of operation, cam means motivates assembling and ejector mechanism to assemble the pin thus formed to a hollow button fed thereunder.

Another object of my invention is to provide wire feeding means to the said pin-forming and assembling station whereby a single wire at a time is fed, the remaining wires being agitated so as to prevent clogging of the wire-feeding mechanism.

A still further object of my invention is to provide in a machine of the aforementioned character a pin bending, forming and assembling station; the pin being formed and captured in a contracted position of a dimension substantially smaller than the diameter of the lip portion on the button to which it is to be assembled, and means for instantaneously ejecting the pin simultaneously forcing it into the hollow button recess before the contracted formation of the pin formation is permitted to expand. In other words, the assembly operation and the release of the contracted pin mechanism from its forming punch into the hollow recess or cavity within the button is so instantaneous that expansion of the contracted part of the pin cannot take place before the pin has reached the cavity.

Another object of my invention is to provide triple slide means intermittently fed by pawl means which are cam actuated at predetermined intervals so as to permit, at the initial operation of the slide cycle, advancing the lowermost slide simultaneously with the intermediate slide thus forming a pocket receptive to the button, which is fed through the hopper and chute mechanisms, and in continuing the advancing cycle the upper slide is brought into alignment and superimposition over the said lower and intermediate slides in order to form a complete enclosure for the button to prevent disturbance thereof preparatory to the insertion of the formed pin which has been formed a priori.

A further object of my invention is to provide pin-bending and semi-circular forming mechanism which is arranged to capture the wire fed to the pin bending and forming mechanism so as to retain the same in position until the cycle of the button pinning operation has been advanced to the point where the formed pin is to be placed into the cavity of the button. The said pin bending and forming mechanism is provided with suitable knock-out mechanism to advance the pin into the cavity of the button positioned directly thereunder.

A still further object of my invention is to provide pin feeding means receiving delivery from a hopper mechanism (not indicated) feeding the pins with their pointed ends in the same direction, and stacking them in a trough-like unit so as to permit advancing the lowermost of said pins, at the same time agitating the pins superimposed thereabove in order to prevent clogging of that particular unit of the machine.

A still further object of my invention is to provide an automatic machine whereby the original rotary motion of the prime mover is translated to articulate rod driving means so that the pin advancing mechanism and the button advancing mechanism are each advanced in proper timed sequence and relationship to the assembling unit.

A still further object of my invention is to provide a button assembling machine which is of simple and practical construction, which is arranged so as to require the least number of motions in assembly in order that production of these items may be made very rapid.

Other objects, advantages, and ancillary features, inherent in my invention will become apparent from an examination of the accompanying drawings, bearing further elucidation in the ensuing description, wherein like symbols represent like parts and in which.

The said figures represent the operations taking place in the machine in order to produce the finished result of Fig. 5.

Referring to the various views, the objects of my invention will be more readily ascertainable by reference to Figs. 1–5 indicating the operations to be performed by the machine comprising my invention.

Figures 1, 2, 3, 4, 5, 41, 42, 43, 44, 45:
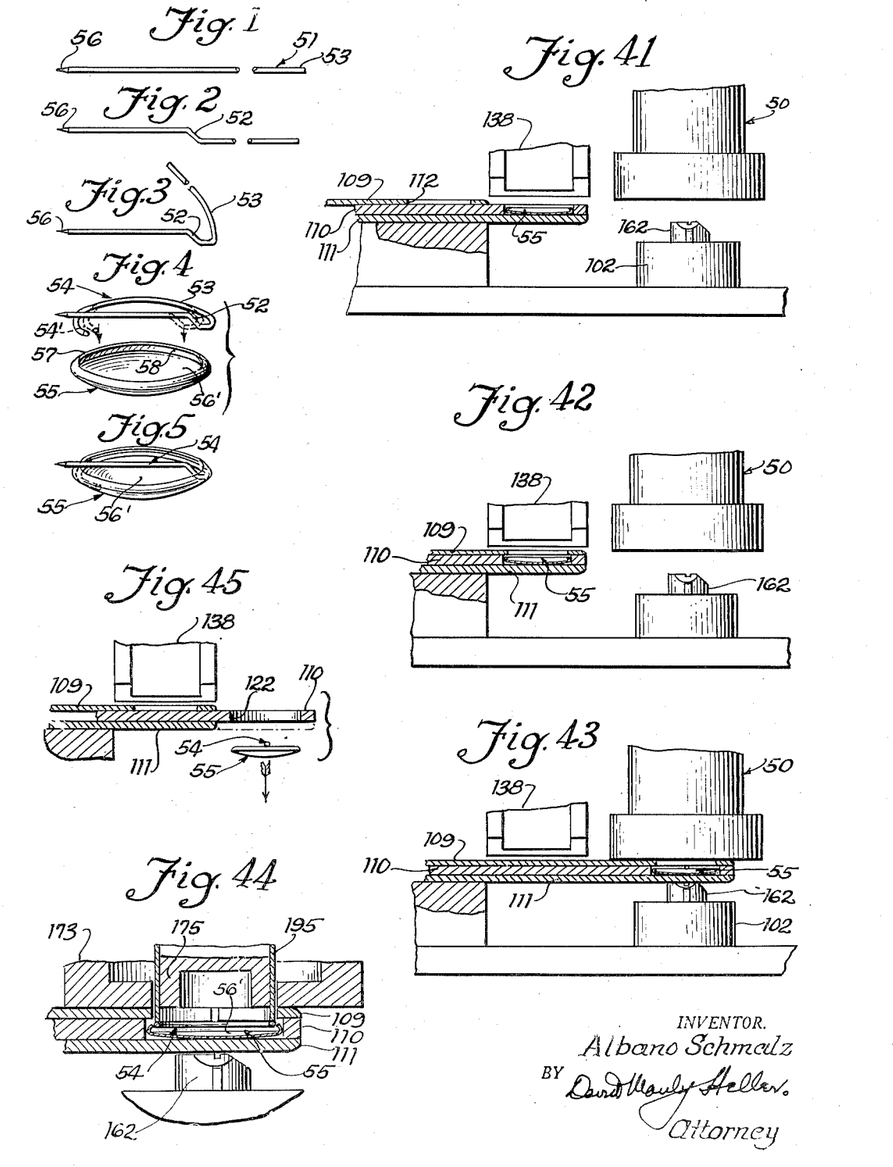
Fig. 1 represents a straight pointed pin which is one of the elements supplied to the machine.
Fig. 2 shows the second operation to which the pin is subjected; namely that of forming an angular bend therein.
Fig. 3 shows the bent pin subjected to the semicircular coiling or forming operation.
Fig. 4 shows the formed and bent pin in its proper relationship prior to insertion in the cavity of a button.
Fig. 5 shows the completed operation.
Fig. 41 is a view partly in section, showing the relationship of the button feeding chute, the lowermost slide, and the intermediate slide in position for receiving a button thereinto as related to the position of the anvil and the bending and forming punch mechanism.
Fig. 42 is a similar view showing the advancement of the uppermost slide in order to capture the button and hold it firmly in place preparatory to the assembly operation.
Fig. 43 is a similar view showing the next step in the cycle of the assembling operation, wherein the three slides are advanced simultaneously to a position co-axially with the bending and forming punch and the space between the anvil and the pin-bending and forming punch.
Fig. 44 indicates the operation of the knock-out sleeve or of assembling sleeve mechanism in the operation of ejecting and introducing the formed pin into the cavity of the button.
Fig. 45 shows the retracting of the uppermost and lowermost slides simultaneously leaving the intermediate slide extended so as to permit the finished button to drop therethrough.

In Fig. 1, I show a pointed pin 51 pointed at one end designated 56 the other end being designated 53. The said pin is fed through a hopper mechanism into a chute where the pins are superimposed in vertical formation and are grabbed by pin delivery mechanism to be fed to a forming anvil and punch bending or forming unit in order to form the bend 52 substantially at the point indicated in Fig. 2.

The subsequent operation is for the pin forming mechanism to grasp the end 53 and form it into a substantially semi-circular portion as indicated in Fig. 3 showing the initiation of the forming operation and the completed pin bending and forming operation in Fig. 4; the completed bent and formed pin being designated 54.

In Fig. 4, in proper alignment with the pin 54 is the button 55 which is provided with a cavity 56' adapted to receive the pin 54 in assemblage therewith.

It is to be noted that an important feature of my invention is the formation of the semi-circular portion 53 of the finished pin 54 to a restricted or smaller diametral magnitude as indicated by the dotted lines in Fig. 4 so that the same will clear the lip 57 on the upper part of the button; thus when the pin 54 in its restricted form 54' is forced past the lips 57 and is released from the forming punch it will expand and seat itself firmly within the recess 58 provided on the button 55 completing the operation.

Figure 6:
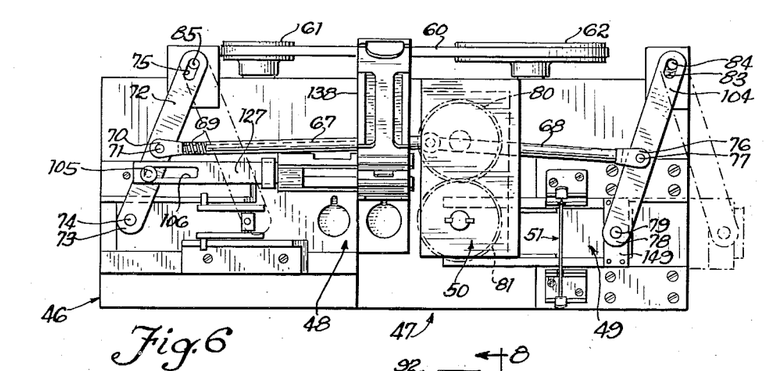
Fig. 6 is a top view of the machine comprising my invention shown in position preparatory to initiating the feeding operations at the beginning of the assembly cycle.
Figure 7:
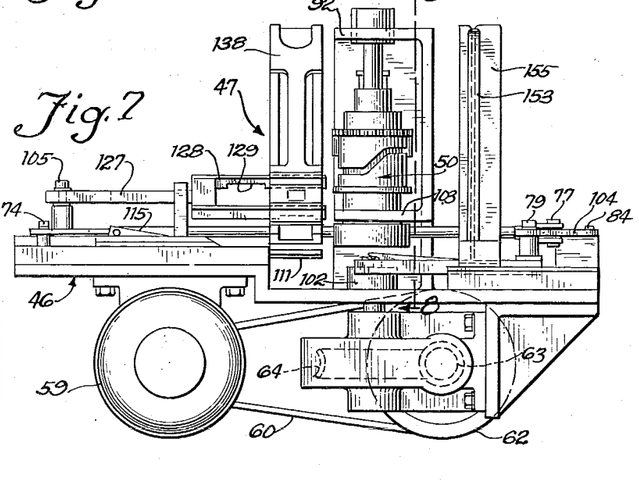
Fig. 7 is a front view of the machine of Fig. 6.
Figure 8:
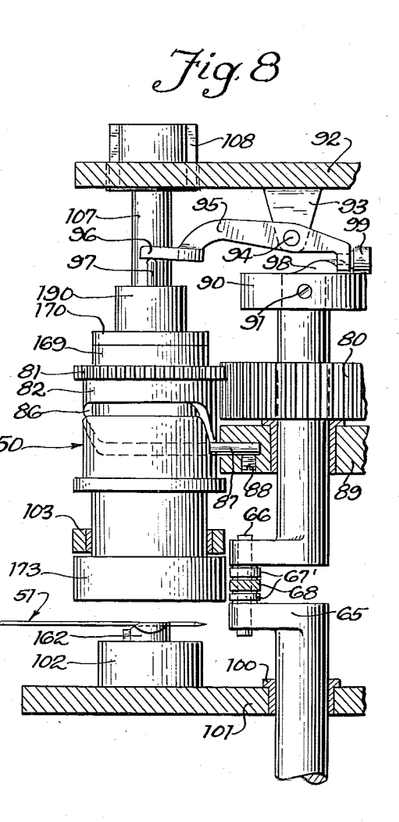
Fig. 8 is a longitudinal sectional view taken substantially on the lines 8—8 of Fig. 7.

Referring to Figs. 6, 7 and 8, it is to be noted, that in Fig. 6, I provide a station 48 for feeding the buttons from suitable hopper mechanism (not shown) to the pin-bending, forming and assembling punch mechanism 50. In the same view, is also shown the mechanism 49 for feeding individual pins 51 to the pin-bending, forming and assembling mechanism 50.

The machine is generally designated 47.

The various sections of the machine hereinbefore mentioned are held together by suitable framework 46 and are driven by the prime mover 59, the stations of operation; namely 48, 49 and 50 are synchronized by the prime mover 59 which is provided with a driving pulley 61 interconnected to a driven pulley 62 by means of a belt 60. The transmission connection between the driven pulley 62 and the remainder of the mechanism comprises a worm 63 which is connected to the driven pulley 62 and is in mesh with a worm gear 64 so as to afford the proper reduced speed necessary for the operation of the various stations and to synchronize the action thereof.

The worm wheel 64 motivates the crank shaft 65 which is provided with a crank pin 66 giving it the proper throw so as to afford proper action therefor. The said crank pin has secured thereto the motivating rods 67 and 68. The motivating rod 68 is provided with an eye portion to engage the crank pin 66 whereas the motivating rod 67 is provided with a bifurcated end 67' having suitable bores therethrough, the bifurcation 67' is mounted on the crank pin 66 in straddling relationship with respect to the eye of the motivating rod 68. The rod 68 has a bifurcated portion 76 connected by pin 77 to the lever 104.

The other terminal portion of the rod 68 may be bifurcated as indicated at 76 in order to engage the oscillating lever 104 at some intermediate point thereof. The said motivating lever 104 has one of its termini 78 articulately connected by the pin 79 to a slide mechanism adapted to single out an individual pin 51 and feed it when the said lever 104 is motivated from the position of the dotted lines to that indicated by the full lines. The motivating rod 67 is interconnected to its bifurcated end 70 by means of a spring 69 in order to transmit the varied travel and dwell necessary to the motivating rods 67 and 68. The rod 67 travels a greater distance or through a larger arc, that is lever 72 travels through a greater arc than the motivating lever 104. The lever 72 is connected to the bifurcation 70 of the motivating rod 67 by means of a pivot pin 71. The said motivating lever 72 has one of its termini 73 articulately secured by means of pivot pin 74 to the slide mechanism that will motivate the button to proper assembly position when the lever 72 moves from the position indicated by full lines to that position indicated by the dotted lines in Fig. 6. The lever 72 is pivoted on the pin 85 and is provided with a slot 75, whereas the lever 104 is pivoted on the pin 84 and is provided with a slot 83 so as to equalize the articulate movements of the said levers.

It is to be noted that the motivating lever 72 is also connected to an individual button feed mechanism by means of the connection 105 operating in the slot 106 in order to provide the necessary lost motion required to feed the button, so as to allow the slide assembly 48 to advance before the actual feeding of an individual button 55 takes place. The detailed mechanism of each of the said sections will presently be described.

The transmission means is further to be understood as continuing from the motivating crank 65 which has mounted thereon a gear 80 the teeth of which are of greater width than that of the enlarged spur gear section 81 on the barrel cam 82. The reason therefor is that the forming and bending mechanism has to move vertically, hence the spur gear 81 and the spur gear 80 remain in mesh during the vertical movement.

The barrel cam 82 is provided with a cam race 86 in order to guide the pin forming and bending actions in proper cyclic relationship; the said race 86 being engaged by the guide pin 87 secured to a portion 89 of the supporting framework and being held securely in place by the set screw 88.

The crank 65 is also provided with a cam drum 90 at its top secured in place by set screw 91 in its proper cyclic position. The said cam 90 is provided with a cam portion 98 in order to permit the roller or follower 99 to be actuated thereby at certain predetermined portions of its 360-degree revolution. The crank 65 is rotatably supported in bushing 100 secured to a web 101 of the framework 46.

The roller 99 is mounted on an oscillating lever 95 which is pivoted by virtue of the pin 94 to the depending bearing portion 93 secured at some point to a web 92 on the supporting framework 46.

It is to be noted that the knock-out or ejection mechanism 97, to be later described, is motivated by the lever 95 when the cam roller mounts the protuberance 98 on the cam; the said lever 95 being formed with a bifurcated section 96 so as to clear the central shaft 107 which is operated in a suitable bearing 108 on the web structure 92.

Thus, the operation of the machine, generally speaking, is that when the motor is set into operation, the slide mechanism 48 will advance in order to receive a button, then it will continue to advance and place the button in captured position below the pin-bending and forming punch; alternately with the advancing of the slide mechanism 48, the pin 51 is advanced to the pin-bending, forming and assembling station; it is bent, formed and assembled, then the intermediate slide is retarded partially while the upper and lower slides are being retracted in order to expose the completed button to permit it to drop through as a finished product.

The details of the individual operating stations 48, 49 and 50 now follows:

Figs. 9 to 20 show the various elevations and sections as well as elemental views of the novel structure incorporated in the feeding mechanism employed for feeding a button in its proper position with respect to the pin-bending, forming and assembling station.

Figure 11:
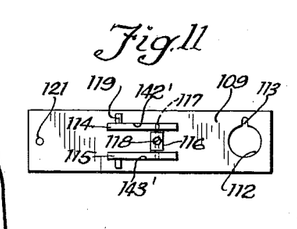
Fig. 11 is a top view of the upper slide element with the actuating pawl shown fitted thereinto so as to be motivated synchronously thereby.
Figure 12:
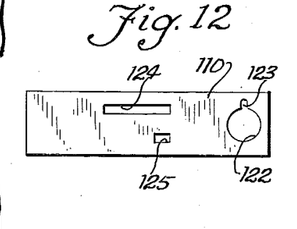
Fig. 12 is a plan view of the intermediate slide element.
Figure 13:
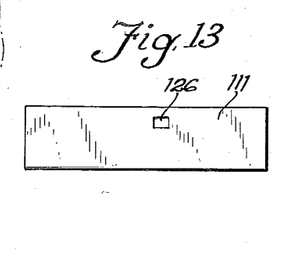
Fig. 13 is a top view of the lowermost slide element.

The slides are motivated, as heretofore described, by the motivating lever 72 being pivoted at 73 to the slide mechanism. The slide mechanism consists of three elements. The feeding of the slides is provided by the following mechanism. The slide consists of three individual slide elements: an upper slide element 109, an intermediate slide element 110, and a lowermost slide element 111—all arranged in intimate contactual relationship so as to slide in accordance with the cycle requirements of the machine.

The slide 109 is provided with a circular opening 112, and an elongated arch 113 merging therewith so as to provide clearance for the pin which has been bent, formed and is in restricted formation ready for ejection therethrough.

The opening 112 has another function; namely, that of holding the button firmly in place within the center slide which is holding the button between the upper slide 109 and the lower slide 111 being firmly held in position in the central slide 110. The action of the slides will be best understood by reference to Figs. 14 to 20 and will be presently explained.

Figures 14, 16:
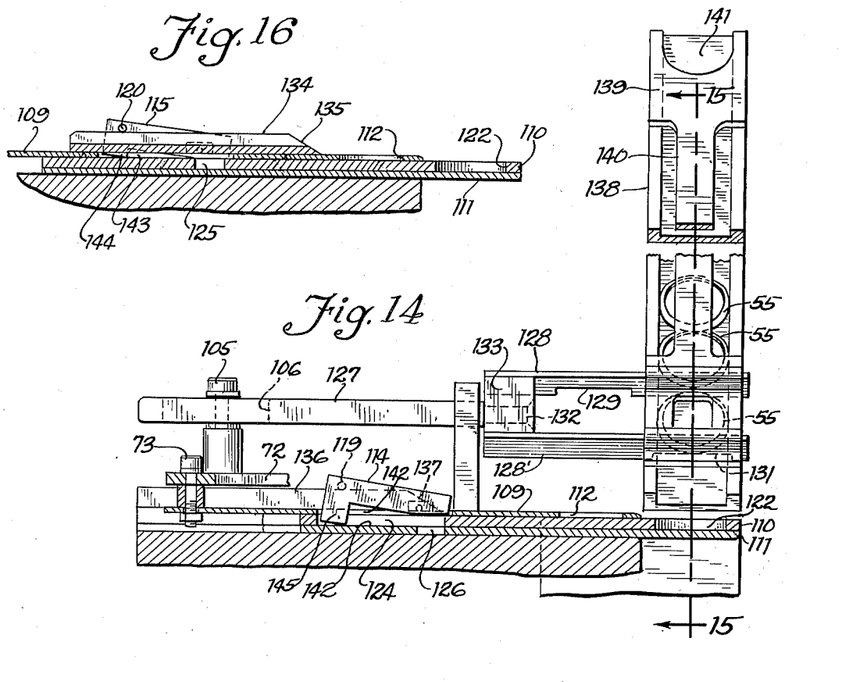
Fig. 14 is a cross-sectional view taken substantially on the lines 14—14 of Fig. 9.
Fig. 16 is a cross-sectional view taken substantially on the lines 16—16 of Fig. 9.
Figure 15:
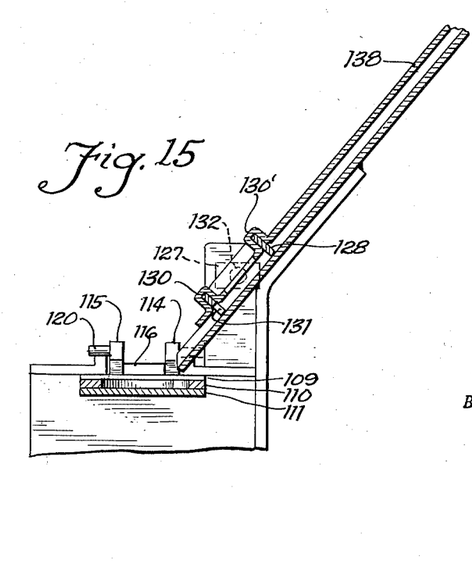
Fig. 15 is a cross-sectional view taken substantially on the lines 15—15 of Fig. 14.

In connection with the slide structure, it should be noted that the uppermost slide 109 is provided with a bore 121 to which is secured the motivating pivot pin 73 so that the motivating lever 72 when it moves through its arcuate ambital movement will motivate the slide through its proper forward and return strokes. The slides 110 and 111 are motivated intermittently by the slide 109 by virtue of the pawl structures 115 and 114. The said pawls are pivoted on a pin 117 which is held rigidly in place in the bearing 116 by virtue of a set screw 118 or other suitable fastening. Each of the pawls 114 and 115 are permitted to oscillate independently about the pivot pin 117 and each is provided with a follower 119 and 120 respectively. The pawls 114 and 115 operate in the slots 142' and 143' of slide element 109.

The intermediate slide 110 is provided also with a circular opening 122 merging with a clearance opening 123 for the extension of the pointed portion of the pin to clear therethrough when it is being assembled, and it is further provided with an elongated slot 124 to be engaged in proper timing relationships through suitable cam action by the feeding pawl 114 and a smaller slot 125 which is engaged in proper timing sequence by the pawl 115 when the pawl has its toothed portion engaged in said slots respectively.

Thus it can be seen that the pawl 114 will travel in the slot 124 without moving the slide until its toothed portion contacts the right-hand end of the slot 124 and simultaneously therewith the pawl 115 will motivate the slide 110 when the toothed portion thereof engages the small slot 125.

The pawl 114 has another function, that of engaging the slide 111 by virtue of its slotted portion 126 so that the pawl 114 effectuates intermittent movement of the slides 109, 110 and 111 at predetermined times depending upon the positioning of the said cams operating on the followers 119 and 120 and the timing sequence therewith.

Figure 9:
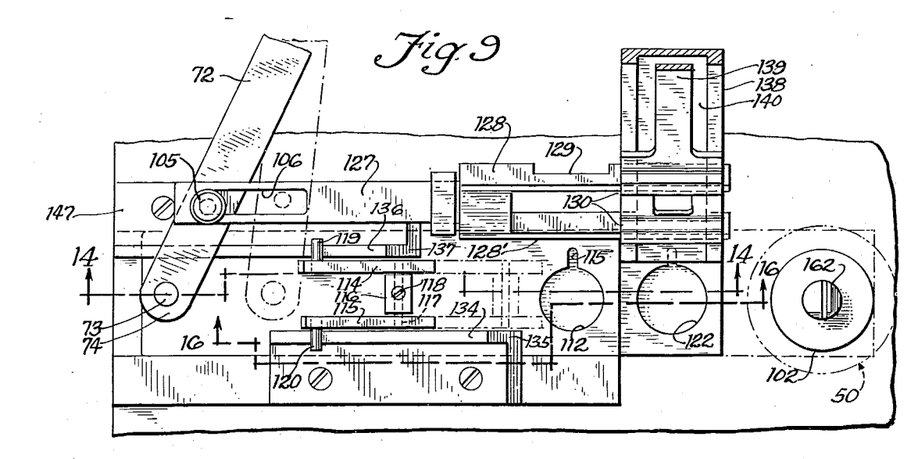
Fig. 9 is an enlarged plan view of the button feeding mechanism with certain portions omitted in order to more clearly indicate the structural elements embraced in the said mechanism, and indicates the initial part of the button feeding cycle.
Figure 10:
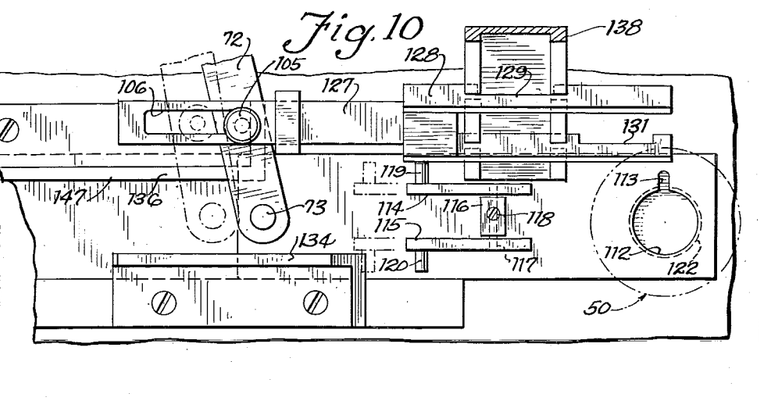
Fig. 10 is a view similar to Fig. 9 indicating the completion of the button feeding cycle preparatory to receiving the pin element thereinto.

The motivating lever 72 has another function, namely, through its connection 105, which operates in the slot 106 of the button feeding element at the initial stroke or movement of the motivating lever 72, the bifurcations 128 and 128' provide an escapement mechanism allowing a single button to escape therethrough. At the initial movement of the motivating lever 72, the intermediate slide 110 and the lower slide 111 remain stationary to receive a button, the continued movement of slide 109 causes the same to register and align with the slides 110 and 111, subsequently all slides 109, 110, and 111 continue to advance in unison to be positioned directly and intermediately the anvil and pin bending and forming station. While the slide 109 moves the toothed portion 145 rides on the surface of the intermediate slide 110 until it engages the opening 124. When motion of the intermediate slide 110 is proceeded with, and subsequently when the toothed portion 144 rides on the top surface 143 of slide 110, the same is not motivated. The continued movement of the motivating lever 72 will advance the feeding pawl 115 until its follower 120 riding on the surface 134 will drop on the incline 135 causing the tooth 144 to engage the slotted portion 125 thus advancing the central or intermediate slide 110. Simultaneously with that action, the feeding pawl 114 is also advanced and rides on the surface 142 of the lowermost slide 111 until the toothed portion 145 drops into the slot 126 and causes the same to be advanced.

The toothed pawl is actuated by its follower 119, which rides on the surface 136 until it meets the incline 137, which permits the toothed portion 145 to engage the lowermost slide 111 thus the pawls 114 and 115 will move the two slides 110 and 111 together toward the pin-bending, forming and assembling station. Prior to this action, however, the movement of the motivating forked element, having a handle portion 127 engaged through the slotted portion 106 by the motivating connection 105, will cause the bifurcations 128 and 128' to operate in guideways 130 in the chute 133.

The bifurcations 128 and 128' are provided with staggered openings 129 and 131 the same operate within the chute 138 so that the column of buttons 55 supported in the said chute will be permitted to escape one at a time and fall directly into the opening 122 (see Fig. 14). The openings 129 and 131 afford a sort of escapement for a single button. The chute operates from a hopper mechanism (not shown) which will orient the buttons 55 so that they will fall into the trough 141 of the chute 138. The chute is covered by a skeleton cover 139 having openings 140 so as to permit operators, or inspectors, to see to it that the buttons are fed thereinto in the correct position, and to permit removal of the buttons which are accidentally fed in the wrong position.

The bifurcations 128 and 128' are provided with escapement openings or cut-outs 129 and 131 in staggered relationship so that its to and fro motion, the handle 127 motivating these bifurcations 128 and 128', will cause on the one hand the slot 129 to come into alignment with the buttons 55 and permit one button to pass therethrough; the bifurcation 128' holding the button captured within the confines of the bifurcations 128 and 128'. As soon as the handle element 127 is retracted to the position shown in full lines in Fig. 14 the button 55 which had been held between the bifurcations will come into alignment with the opening or cut-out 131 thus permitting it to slide downwardly into the chute 138 and into the opening or well 122 provided therefor in the intermediate slide 110 the button being held in place, or supported, by closure of the lowermost slide 111.

It is to be noted that the bifurcations 128 and 128' are secured by an intermediate block-like support 133 which is secured to a reduced extension 132 of the handle 127 by riveting or other suitable fastening means.

On the return stroke after button 55 had been permitted to enter, or to be fed, to the well 122, the remaining buttons are held and supported by the closed portion of the bifurcation 128 at its terminus; thus at each complete oscillation of the bifurcation, or of the handle element 127, on the forward stroke a button is fed into the confines of the bifurcation; on the return stroke a button is released from the confines of the bifurcation—the other buttons thus being held under control so that their weight will not impair the smooth operation of the machine, and assure a single button being fed at a time, at each and every stroke.

Figure 17:
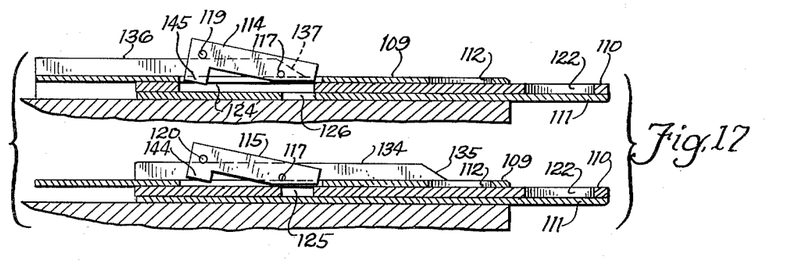
Fig. 17 represents two simplified cross-sectional views taken on lines 14—14 and 16—16 of Fig. 9 the view being taken through the planes of the pawls 114 and 115 in which respect it somewhat resembles in part Figs. 14 and 16 in order to bring out the action of the button feeding slides. This view shows the initial position of the two driving pawls and the button feeding slides in a complete cycle.

Fig. 17 shows a dual cross section of the feeding pawls and the slides in their proper time sequence or arrangement showing the cams in proper relationship so that in Fig. 17 it will be noted the position is indicated whereby the slides 110 and 111 are held in readiness to receive a single button into the well 122.

The position of the feeding pawls and their teeth are shown in that view in their proper relationship. The action to follow is indicated in Fig. 18 showing that the toothed portion of the pawl 115 is traveling on the surface of slide 110 and is merely sliding idly, also in the upper slide 109, so that it will not be motivated until given the proper dwell for the button to locate in the well 122, whereas the feed pawl 114 is positioned in the slot of the uppermost slide 109, and is traveling therein until the toothed portion 144 of the pawl 115 will drop into the slot 126.

In Fig. 17, it can be seen that the slides 110 and 111 are in position to receive the individual button from the chute which has been fed in accordance with the explanation supra.

Figure 18:
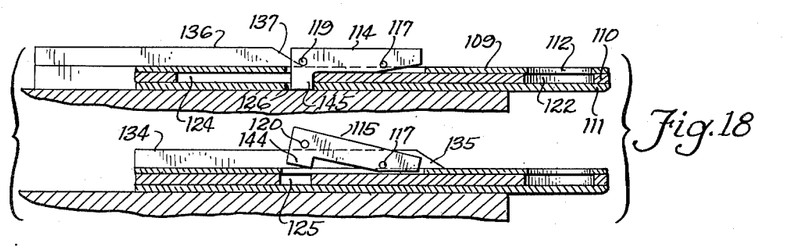
Fig. 18 is similar to Fig. 17 and indicates the feeding of the slides by means of the pawl elements advanced to the position where the button is captured between the slides, and held ready for the assembly operation.
Figure 19:
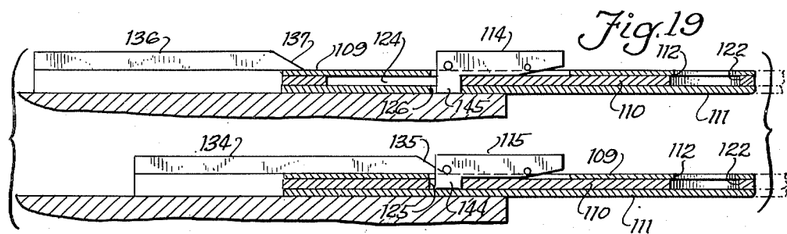
Fig. 19 is similar to Fig. 17 showing the slides advanced to complete the cycle and ready for receiving the pin in assembly with the button held by the slides.

The slides will remain in their position until the tooth 145 will drop into the slot 126 thus the slide 109 will be motivated to capture the button 55 within the well 122 as indicated in Fig. 18. The three slides will advance now in unison as indicated in Fig. 19, until they reach the pin-bending, forming and assembling station ready to receive the pin in assembly. In Fig. 19, it is to be noted that the opening 112 is smaller than the opening 122 so as to hold the button in captivity firmly, so that its position may not be disturbed during the instant assembling operation when the pin-bending, forming and assembling station descends thereupon.

Figure 20:
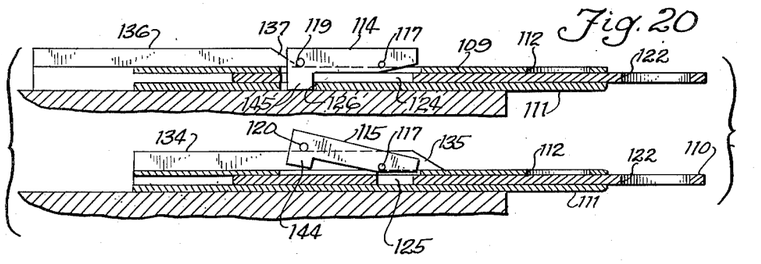
Fig. 20 is a view similar to Fig. 19 indicating the return of the slides, completing the button feeding cycle ready for ejection of the completed button, preparatory to completing the entire feeding cycle of the slide elements.
Figure 21:
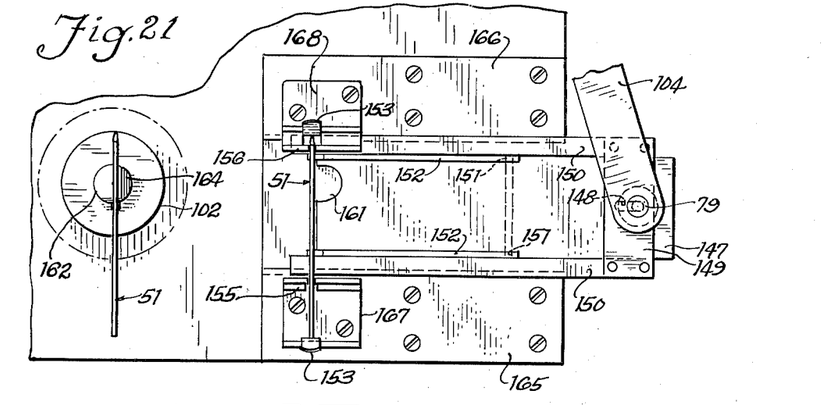
Fig. 21 is a top view showing the pin feeding apparatus in the initial position of the feeding cycle thereof.
Figure 22:
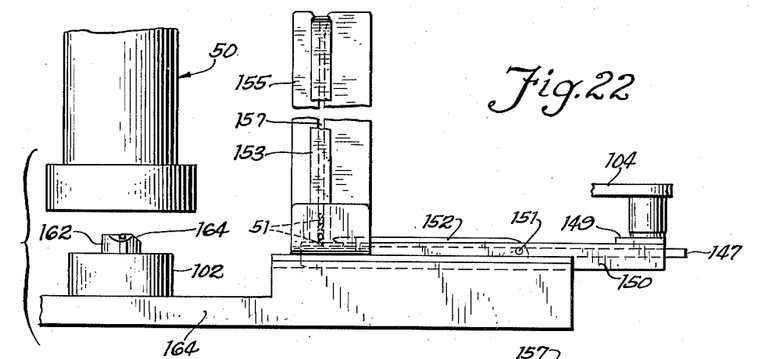
Fig. 22 is a front view of Fig. 21.

The return movement of the lever 72 as indicated in Fig. 20 will cause the uppermost and lowermost slides to recede initially in order to allow the assembled button to drop out of the opening 122 into the finished pile of buttons on which the operation is complete.

It is to be noted that in Fig. 18, the toothed portion 145 of the pawl 114 has dropped into both slots 124 and 126 whereas the feed pawl 115 is ready to drop into the slot 125 and by virtue of the two pawls 114 and 115 the three slides will thus be advanced in unison as indicated in Fig. 19.

Fig. 20 shows that the pawl 115 has been lifted out of the slot 125 therefore allowing the intermediate slide 110 to remain in fixed position while the pawl 114 is engaging openings 124 and 126 thus motivating the slides 109 and 111, while the toothed portion 145 operating within the slotted portion 124 of the intermediate slide thus affords lost motion to the intermediate slide 110 and permits the completed button to drop out of the opening 122.

To supplement Figs. 14 to 20 fragmentary enlarged views are indicated of the pin-bending, forming and assembling station in concert with the button feeding chute, and the button feeding triple slide construction as amplified further in Figs. 41 to 45.

In Fig. 41, the button is shown after it has dropped off into the pocket formed by the intermediate slide 110 and the bottom slide 111 but with the slide 109 in retarded position.

In Fig. 42, the next step in the cycle is indicated wherein the upper slide 109 has moved to register coincidentally with the intermediate slide 110 and the bottom slide 111, and, in view of the closure 112, which is smaller than the bore 122, it can be seen that the button will be held in captivity so that it cannot be disturbed, and is fully under control, prior to the assembly operation.

In Fig. 43, the three slides are shown to have advanced in unison with the captured button in proper position under the pin-bending, forming and assembly station, wherein it is indicated that the pin-bending, forming and assembling unit has been retracted upwardly from the anvil structure, and the slides are supported by the anvil 162 and held firmly between the pin-bending, forming and discharge mechanism and the anvil ready to receive the formed and bent pin. The anvil 162 is secured to the support 102.

Fig. 44 indicates how the pin is discharged instantly by the knock-out or ejecting mechanism and forced in its formed and still retracted position to move into the recess 54 of the cavity 56' of the button 55. Although the height of the bore in the intermediate slide is somewhat greater than the height of the button, in order to allow for the overlapping of the pointed pin portion 56 which lies in the plane above the plane of the semi-circularly bent portion 53, nevertheless, the expansion of the pin will not take place prior to completion of its movement downwardly into the recess 58 and past the lips 57 of the button 55. The ejection action will be so instantaneous as to be more rapid than the normal expansion of the spring-like material which is used for making the pins.

In Fig. 45, the upper slide and the lower slide are retracting while the intermediate slide remains stationary in order to permit the assembled button and pin to fall through as completed.

The pin feeding mechanism is illustrated in Figs. 21 to 31, inclusive, and it is shown that the motivating rod 104 is secured by means of a connecting element 79 to the slide 147 and fitted into the slot 148 to afford lost motion to the slide 147 while the slide 150 is motivated. The slide 150 consists of two sections tied together by strap 149. As soon as the slide 150 has been motivated, whereby the connecting stud 79 reaches the terminus of the slot 148 at the left, then the slide 150 will actuate the slide 147. The said slide 150 is provided with extensions 166' which receive partly the diameter of the lowermost pin 51 in the V-shaped recess 163 until the delivery slide 150 advances. On the said delivery slide, 150 there are two delivery fingers 152 pivoted at 151 and provided with an angular lower jaw portion 159 and a toothed upper jaw portion 158 which has an arcuate surface 161. The two jaws form an included recess 160 where the pin 51 is grasped by the delivery fingers 152.

Figure 24:
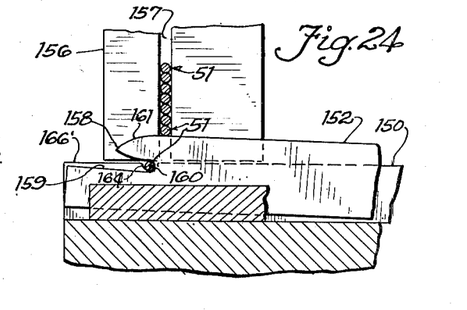
Fig. 24 is an enlarged view of the individual pin-feeding mechanism, and agitating element for agitating the remainder of the pins to prevent clogging of the pin feeding chute.
Figure 25:
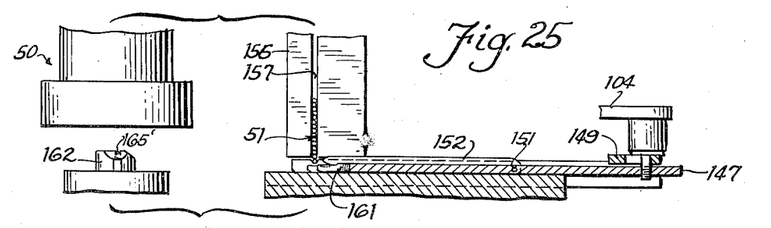
Fig. 25 is a schematic view showing the initial position preparatory to feeding one pin to the forming and bending die mechanism.
Figure 26:
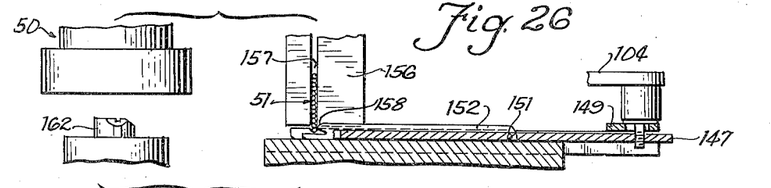
Fig. 26 indicates a view similar to Fig. 25 preparatory to separating the lowermost pin and capturing the same for feeding onto the bending anvil of the pin bending and forming mechanism.
Figure 27:
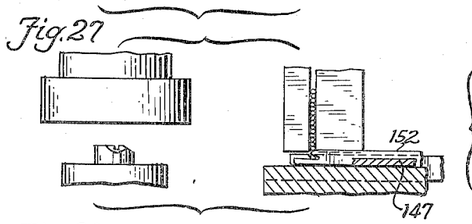
Fig. 27 is a view similar to Fig. 26 showing one pin in place ready to be fed to the anvil.
Figure 28:
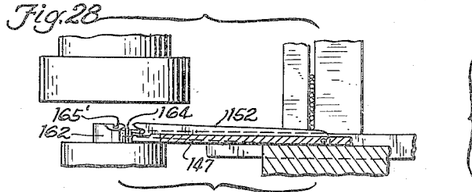
Fig. 28 shows the pin feeding mechanism about to complete its cycle in feeding the pin to the anvil mechanism.
Figure 29:
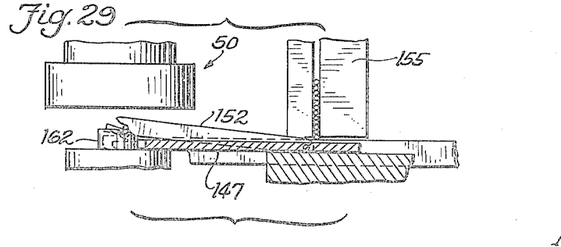
Fig. 29 shows the positioning of the pin in the slot provided therefor in the anvil mechanism.
Figure 30:
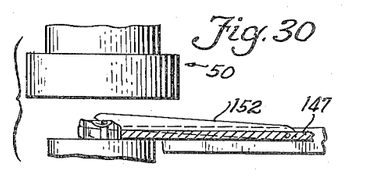
Fig. 30 shows the pin delivery mechanism depositing the pin in the slot of the anvil.
Figure 31:
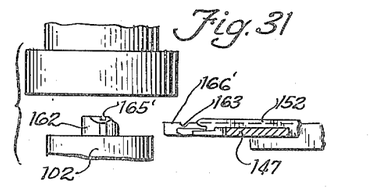
Fig. 31 shows the retracting operation or action of the individual pin delivery mechanism ready to be retracted preparatory to a repetition of the pin-feeding cycle or operation.

As the fingers continue to advance, the arcuate portion 161 will lift the assembled pins 51 above the lowermost pin, and thus tend to agitate them in the slot 157 in the guideways 155 and 156 to which they are delivered from the hopper sorting mechanism (not shown).

Figure 23:
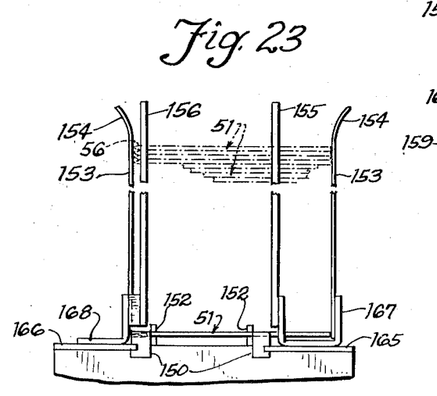
Fig. 23 is an end view of the pin chute or slide mechanism which receives in superimposed position the pointed pins pointing in one direction the same being received from the hopper mechanism (not shown).

Lengthwise the pins are located by the spring-like elements 153 which show the pins located with their pointed ends 56 in the same direction. The said lateral locating elements 153 are suitably flared out at 154 in order to facilitate entry of the pins after assortment by the hopper. Thus the pins 51 are agitated to prevent clogging the opening or guide slot 157. As the lowermost pin 51 is grasped in the throat 160, and the delivery fingers 152 continue to advance toward the anvil 162, the pin 51 engages the inclined portion 164 which causes the delivery fingers to rise and follow through in order to drop the pin 51 into the anvil holding slot 165'. The anvil 162 is suitably mounted on a rigid stud support 102 which, in turn, is mounted on the web 101 of the framework. The gibs 165 and 166 are provided as guideways for the slide 150. Brackets 167 and 168 serve to hold the elements 153, 155 and 156 in proper relationship for guiding the pins 51.

The foregoing operation of feeding the pins to the anvil is brought about at the same time that the buttons are being fed by the triple slide mechanism heretofore described.

Figs. 32 to 40 illustrate the pin-bending, forming and assembling station or mechanism, and in those views it is shown that the anvil structure 162 is an insert in a support 102 and held securely thereto by means of set screws 181. The said anvil is provided with a configuration similar to that of the bent portion 52 of the pin which is designated on the anvil as 179 and is provided with a slotted portion 165' to receive the pin 51.

Figures 32, 33, 34, 35:
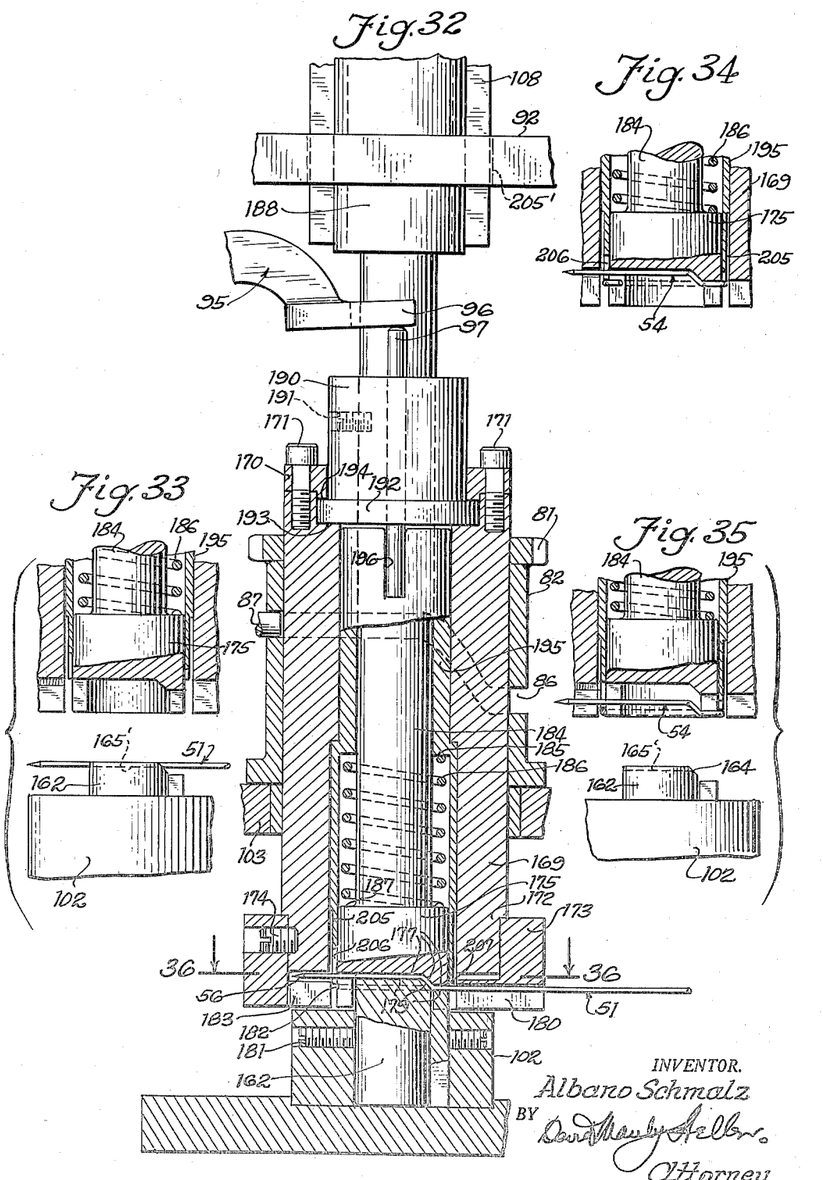
Fig. 32 is a longitudinal cross-sectional view showing the pin bending and forming mechanism at the moment the pin is offset between the punch above and the anvil below.
Fig. 33 shows the anvil and a fragment of the pin bending and forming punch in cross section prior to descending on the anvil to hold the pin preparatory to its bending and semi-circular formation.
Fig. 34 is a view similar to Fig. 33 showing the pin held withdrawn from the anvil, bent to shape and forming the semi-circular portion thereof, preparatory to its assembly in the button therefor.
Fig. 35 shows the ejector sleeve initiating its downward travel in the action of ejecting the formed pin; the pin bending and forming device having been retracted prior to permitting the button feeding slides to be fed between the pin bending and forming mechanism and the anvil mechanism, preparatory to assembly of the said bent and formed pin within the cavity of the said button.

The punch structure 175 is provided with a mating configurative section 177 complementary to the formation 179, and it is also provided with a slotted recess so that the pin is first captured and held firmly by the punch 175 and the anvil 162 when they are superimposed one over the other on the downward movement of the punch 175 by virtue of movement by the barrel cam 82 heretofore explained. The collar 103 limits the movement of the cam 82.

The forming punch 172 has a reduced end 184 which is connected to an enlarged section 188 provided with keys 109 operating in the keyways 205 in the web 92 of the supporting framework.

The reduced shank 184 operates with a bushing sleeve 190 provided with an enlarged shoulder 192 and held to the reduced shank 184 by virtue of set screws 191, and confined between surfaces 193 and 194.

The enlarged shoulder 192 is fitted in between the surface 194 of a cap 170, which is secured to the hollow body 169 by virtue of screws 171, creating an enclosing structure for the shank 184 and bushing 190 permitting the bushing 190 to rotate with respect to the tubular body 169. The tubular body 169 at its lower terminus is provided with a hardened steel enlarged forming die 173 which has a slotted recess therein 180 on the one side and a clearance slot 183 which is somewhat higher on the opposite side in order to clear the bend 52 in the pin 51 as shown in Fig. 32. The die 173 is secured by set screw 174.

The punch 175 may also be provided with a slight fillet 182 so as to locate and hold firmly the semi-circular formation 53 of the pin 51 in captivity, prior to its ejection by the ejector means presently to be described.

It is also to be noted that the semi-circular portion is formed about the punch 175 which is smaller in diameter in order to allow for the recoil of the resilient material from which the pin is formed, and to maintain it in a smaller diameter while in forming captivity until it is discharged into the recess 58.

The punch 175 has a shoulder 187 and on the reduced shank 184 is mounted the ejector sleeve 195 which has a shoulder portion 185 so as to hold or retain about the reduced shank 184 the coil spring 186 normally urging the ejector sleeve 195 upwardly to inoperative position. The said ejector sleeve, as can be seen, is provided with a reduced ejector portion 205 which skirts about the punch 175 and is provided with a clearance slot 206 which is higher than the clearance slot 207 on the opposite end, for obvious reasons, inasmuch as the pin after bending is in a higher plane at the pointed portion, and in a lower plane for the semi-circular coil portion to be formed.

The punch 175 is operated toward and away from the anvil 162 by means of the barrel cam 82 heretofore mentioned and described.

The cam 90 which operates the ejector lever 95 causes, at predetermined time, the extensions 96 to operate the ejector pins 97 which are fitted into the slots 196 of the ejector sleeve 195 compressing the spring 186 and simultaneously pressing the formed pin 54 and ejecting the same into the recess of the button 55 as indicated in Fig. 44. The action of the cam 90 is so instantaneous in effect in assembling the pins into the buttons, the action taking place more rapidly than the normal expansion of the coils of the pins so that the pin will travel downwardly into the button and expand at the proper time to locate and seat itself within the recess 58 of the button 55.

Examining views 36 to 40, it will be noted that the interior of the punch is slightly bored out in order to receive the anvil 162 and also has the slots heretofore identified as 183 and 180. The forming punch which rotates as indicated by the arrows is provided with a forming dog 201 made of hardened material and held firmly in place by the hollow head set screw 202, which is provided with the forming portion 203 operating about the pin 51 held in place between the bending punch and the anvil. As the head 169 is caused to rotate by means of the spur gearing 80 and 81, the semi-circular portion 53 of the wire is thus formed and held in place until the ejector 96 operates the ejector pins 97 prior to which time the head 169, by virtue of the barrel cam 82, will be caused to be raised as indicated in Fig. 33 permitting the slides to enter therebetween as indicated in Fig. 43 thus permitting the assembly operation to be completed.

Figures 36, 37, 38, 39, 40:
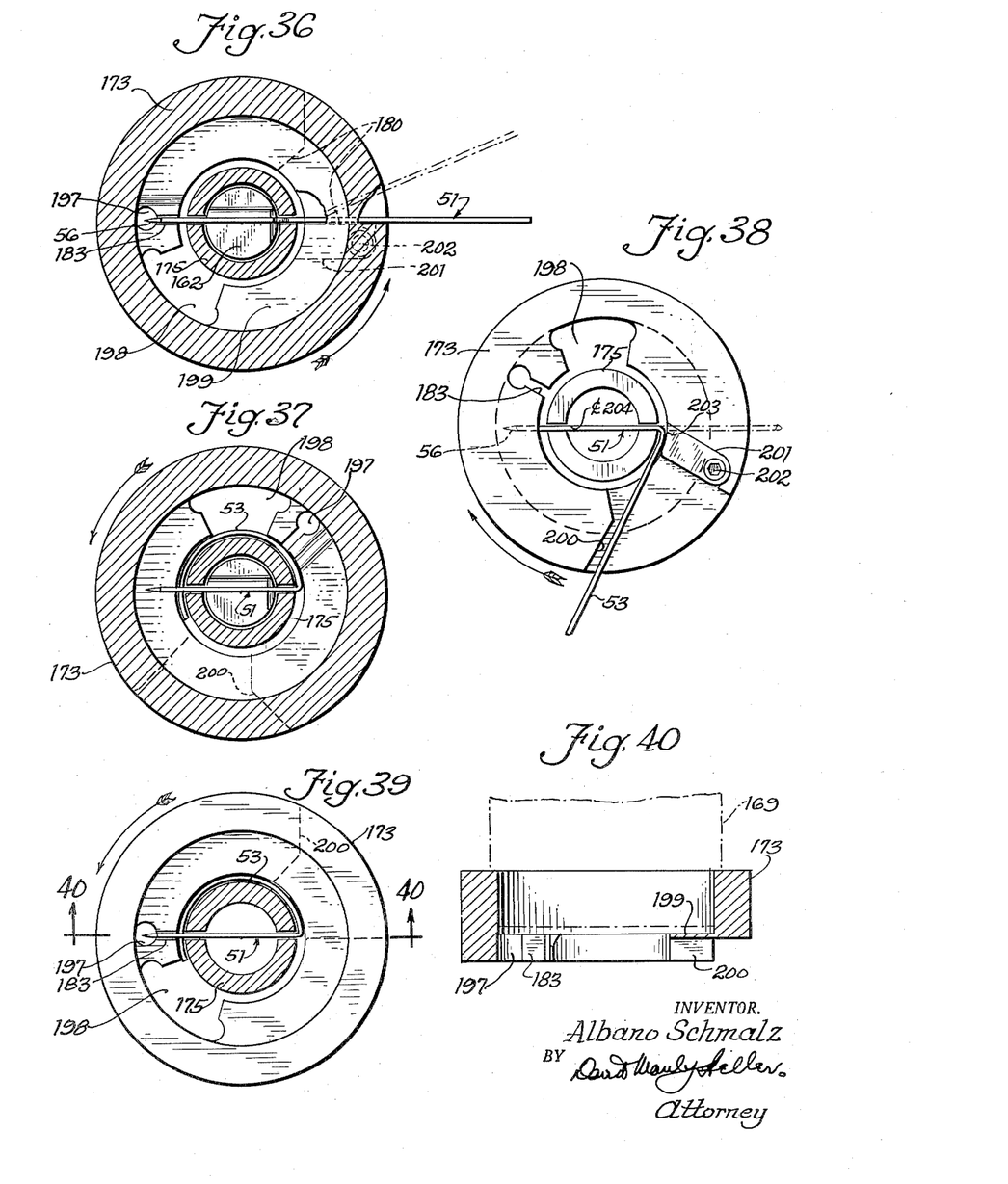
Fig. 36 is a cross-sectional view taken substantially on the lines 36—36 of Fig. 32.
Fig. 37 is a cross-sectional view similar to Fig. 36 in which the pin-forming operation is indicated as having been completed.
Fig. 38 is a view looking upwardly at the forming punch showing the initiation of the semicircular forming operation of the pin.
Fig. 39 is a view similar to Fig. 38 and shows the completion of the formation of the semicircular portion of the pin.
Fig. 40 is a cross-sectional view taken substantially on line 40—40 of Fig. 39.

It is to be noted that in the forming head for clearance have been provided openings 198 and the surfaces 199 are hidden to form hollow pockets so as not to interfere with the travel of the portion 53 of the pin during its semi-circular formation. The angular abutment 200 serves to yieldably support the pin portion 53, prior to, and during the coiling operation.

A clearance bore 197 is provided so as not to damage the point 56 while the punch is operating. It should be noted that the pin 51 is offset in the punch with respect to the center line 204 thereof so as to permit a firm bend by the element 203.

In review, it may be stated that the operation of the machine is, generally, to simultaneously feed a pin to the anvil and the feeding punch and bend and form the pin. The forming and bending punch then retracts upwardly allowing simultaneously the slide mechanism to perform its operations and to locate itself therebetween loaded with a button with its cavity upwardly. The tripping mechanism is then tripped ejecting the formed pin which has been formed in constricted formation so as to permit of its rapid expansion instantaneously as soon as the pin has been bottomed into the button.

The slides then are retracted to normal position by going through the stages indicated in the drawings allowing for the ejection of the completed or assembled button and pin; and simultaneously after completing the withdrawal of the slides a new button is fed into the button slide structure while the pin mechanism and delivery fingers also advance simultaneously agitating the pins and placing the delivery fingers in a position receptive to feed another pin in order to complete the entire cycle of the operations heretofore mentioned; thus delivering completed, assembled pins after each and every cycle.

It is to be understood that changes may be made in the construction and in the combination and arrangement of the several parts, provided that such changes fall within the scope of the appended claims.

Having thus disclosed and revealed my invention, what I claim as new and desire to secure by Letters Patent is:

1. Pin forming and button pinning mechanism; comprising means for feeding a button provided with a cavity which is positioned to face upwardly; means for feeding a straight and pointed pin; anvil means for receiving the said straight pin; and means for bending and forming the said straight pointed pin to restricted configuration to fit within the said button and release the formed pin within the said cavity in the said button; the said anvil means and the said means for bending and forming the said straight pointed pin being co-axially aligned; the said cavity being interposed between the said anvil means and the said means for bending and forming the said straight pointed pin and in co-axial relationship therewith.

2. Pin forming and button pinning mechanism; comprising means for feeding a button provided with a cavity which is positioned to face upwardly; means for feeding a straight and pointed pin; anvil means for receiving the said straight pin; and means for bending and forming the said straight pointed pin to restricted configuration to fit within the said button and release the formed pin within the said cavity in the said button; the said anvil means and the said means for bending and forming the said straight pointed pin being co-axially aligned; the said cavity being interposed between the said anvil means and the said means for bending and forming the said straight pointed pin and in co-axial relationship therewith; the said means for bending and forming the said straight and pointed pin being positioned intermediately the said means for feeding a button and the said means for feeding the said straight pointed pin.

3. Pin forming and button pinning mechanism; comprising means for feeding a button provided with a cavity which is positioned to face upwardly; means for feeding a straight and pointed pin; anvil means for receiving the said straight pin; means for bending and forming the said straight pointed pin to restricted configuration to fit within the said button and release the formed pin within the said cavity in the said button; the said anvil means and the said means for bending and forming the said straight pointed pin being co-axially aligned; the said cavity being interposed between the said anvil means and the said means for bending and forming the said straight pointed pin and in co-axial relationship therewith; and means connected to all the means heretofore recited to synchronize the operations thereof to complete the cycle of operation.

4. Pin forming and button pinning mechanism; comprising means for feeding a button provided with a cavity which is positioned to face upwardly; means for feeding a straight and pointed pin; anvil means for receiving the said straight pin; means for bending and forming the said straight pointed pin to restricted configuration to fit within the said button and release the formed pin within the said cavity in the said button; the said anvil means and the said means for bending and forming the said straight pointed pin being co-axially aligned; the said cavity being interposed between the said anvil means and the said means for bending and forming the said straight pointed pin and in co-axial relationship therewith; the said means for bending and forming the said straight and pointed pin being positioned intermediately the said means for feeding a button and the said means for feeding the said straight pointed pin; and means connected to all the means heretofore recited to synchronize the operations thereof to complete the cycle of operation.

5. The method of assembling pins to buttons; comprising feeding a button provided with a cavity which is positioned to face upwardly; feeding a straight and pointed pin to a bending and forming station; bending and forming the said straight and pointed pin to restricted configuration; and releasing and instantaneously driving the formed pin into the said cavity in the said button.

6. The method of assembling pins to buttons; comprising feeding a button provided with a cavity which is positioned to face upwardly; feeding a straight and pointed pin to a bending and forming station; bending and forming the said straight and pointed pin to restricted configuration; releasing and instantaneously driving the formed pin into the said cavity in the said button; and ejecting the pin and button assembly.

7. In a pin forming and button pinning mechanism; anvil means; feed means delivering a straight and pointed pin to the said anvil means; means for bending in offset relationship the said pin on the said anvil means; forming means on the said means for bending to form the free portion of the said pin to a restricted substantially semi-circular configuration; and means on the said forming means for instantaneously discharging the bent and formed pin into the cavity of a button positioned with the said cavity facing upwardly and concentrically with respect to the said means for bending; the said anvil means and the said means for bending being co-axially aligned.

8. In a pin forming and button pinning mechanism; anvil means; feed means delivering a straight and pointed pin to the said anvil means; means for bending in offset relationship the said pin on the said anvil means; forming means on the said means for bending to form the free portion of the said pin to a restricted substantially semi-circular configuration; means on the said forming means for instantaneously discharging the bent and formed pin into the cavity of a button positioned with the said cavity facing upwardly and concentrically with respect to the said means for bending; the said anvil means and the said means for bending being co-axially aligned; cam means for actuating the said means for bending the said pin, and cam means for intermittently operating the said means for instantaneously ejecting the said bent and formed pin.

9. In a pin forming and button pinning mechanism; anvil means; feed means delivering a straight and pointed pin to the said anvil means; means for bending in offset relationship the said pin on the said anvil means; forming means on the said means for bending the free portion of the said pin to a restricted substantially semi-circular configuration; means on the said forming means for instantaneously discharging the bent and formed pin into the cavity of a button positioned with the said cavity facing upwardly and concentrically with respect to the said means for bending; the said anvil means and the said means for bending being co-axially aligned; and cam means for intermittently operating the said means for instantaneously ejecting the said bent and formed pin.

10. In a pin forming and button pinning mechanism; anvil means; feed means delivering a straight and pointed pin to the said anvil means; means for bending in offset relationship the said pin on the said anvil means; forming means on the said means for bending to form the free portion of the said pin to a restricted substantially semi-circular configuration; means on the said forming means for instantaneously discharging the bent and formed pin into the cavity of a button positioned with the said cavity facing upwardly and concentrically with respect to the said means for bending; the said anvil means and the said means for bending being co-axially aligned; cam means for actuating the said means for bending the said pin; and cam means for intermittently operating the said means for instantaneously ejecting the said bent and formed pin.

11. In a pin forming and button pinning mechanism; anvil means provided with an inclined surface on the receiving side thereof, and feed means for delivering a straight and pointed pin to the said anvil means; comprising chute means for retaining a plurality of straight and pointed pins in superimposed relationship, reciprocating slide means, finger delivery and agitator means articulately mounted on the said reciprocating slide means and operating on the lowermost straight and pointed pin, throat means on the said finger delivery and agitator means adapted to grasp the said lowermost pin and advance the same to climb the said inclined surface in order to be positioned on the said anvil means preparatory to bending of the said pin, and slotted means on the top surface of the said anvil means to capture and retain the said pin after delivery thereinto by the said finger delivery and agitator means simultaneously releasing the said straight and pointed pin from the said throat means.

12. In a pin forming and button pinning mechanism; means for feeding a button, comprising an upper slide element, an intermediate slide element, and a lower slide element; means for motivating the said upper slide element, primary pawl means on said upper slide element for advancing initially during the forward stroke of the said means for motivating the said upper slide element and the said intermediate slide element in unison therewith, secondary pawl means on said upper slide element engaging idly slotted portions in the said intermediate slide element and the said upper slide element, and a slotted portion on the said lower slide element engageable by the said secondary pawl means to cooperatively advance the three slide elements in unison.

13. In a pin forming and button pinning mechanism; means for feeding a button provided with a cavity which is positioned to face upwardly, comprising an upper slide element, an intermediate slide element, and a lower slide element, means for motivating the said upper slide element, primary pawl means on said upper slide element for advancing initially during the forward stroke of the said means for motivating the said upper slide element the said intermediate slide element in unison therewith, secondary pawl means on said upper slide element engaging idly slotted portions in the said intermediate slide element and the said upper slide element, and a slotted portion on the said lower slide element engageable by the said secondary pawl means to cooperatively advance the three slide elements in unison, the said intermediate slide element provided with an opening of circular configuration merging with an elongated pin clearance opening to retain a button fed thereinto, the said upper slide element provided with an opening of similar configuration but slightly smaller in diameter to retain a button in captivity.

14. In a pin forming and button pinning mechanism; means for feeding a button provided with a cavity which is positioned to face upwardly, comprising an upper slide element, an intermediate slide element, and a lower slide element, means for motivating the said upper slide element, primary pawl means on said upper slide element for advancing initially during the forward stroke of the said means for motivating the said upper slide element the said intermediate slide element in unison therewith, secondary pawl means on said upper slide element engaging idly slotted portions in the said intermediate slide element and the said upper slide element, and a slotted portion on the said lower slide element engageable by the said secondary pawl means to cooperatively advance the three slide elements in unison, the said intermediate slide element provided with an opening of circular configuration merging with an elongated pin clearance opening to retain a button fed thereinto, the said upper slide element provided with an opening of similar configuration but slightly smaller in diameter to retain a button in captivity, the said lower slide element, and the said intermediate slide element cooperatively form a button receiving cavity when advanced in unison, the said upper slide element when advanced to superimposition over the said intermediate slide element and the said lower slide element serving to retain the said button in captivity to prevent displacement thereof.

15. In a pin forming and button pinning mechanism; means for feeding a button provided with a cavity which is positioned to face upwardly, comprising an upper slide element, an intermediate slide element, and a lower slide element, means for motivating the said upper slide element, primary pawl means on said upper slide element for advancing initially during the forward stroke of the said means for motivating the said upper slide element the said intermediate slide element in unison therewith, secondary pawl means on said upper slide element engaging idly slotted portions in the said intermediate slide element and the said upper slide element, and a slotted portion on the said lower slide element engageable by the said secondary pawl means to cooperatively advance the three slide elements in unison, the said intermediate slide element provided with an opening of circular configuration merging with an elongated pin clearance opening to retain a button fed thereinto, the said upper slide element provided with an opening of similar configuration but slightly smaller in diameter to retain a button in captivity, the said lower slide element and the said intermediate slide element cooperatively form a button receiving cavity when advanced in unison, the said upper slide element when advanced to superimposition over the said intermediate slide element and the said lower slide element serving to retain the said button in captivity to prevent displacement thereof, the said primary and secondary pawl means cooperatively effectuate initial movements of the said upper slide element the said intermediate slide element and the said lower slide element in unison and subsequently to complete the return stroke move idly with respect to the said intermediate slide element and continue to motivate the said upper slide element in unison with the said lower slide element to release the said button.

ALBANO SCHMALZ.

REFERENCES CITED

The following references are of record in the file of this patent:

UNITED STATES PATENTS

| Number | Name | Date |
|---|---|---|
| 459,376 | Gooding et al. | Sept. 8, 1891 |
| 1,119,211 | Young | Dec. 1, 1914 |
| 1,463,565 | Wegman | July 31, 1923 |
| 1,817,886 | Carr | Aug. 4, 1931 |
| 2,473,116 | Wegman | June 14, 1949 |